United States Patent
Ikuta et al.

[11] Patent Number: 6,155,134
[45] Date of Patent: Dec. 5, 2000

[54] ROTATION CONTROL APPARATUS

[75] Inventors: Hiroshi Ikuta; Mitsuhiro Ueno; Fumiharu Sudo; Toru Nakahara, all of Chiba, Japan

[73] Assignee: Sony Corporation, Tokyo, Japan

[21] Appl. No.: 08/998,826

[22] Filed: Dec. 29, 1997

[30] Foreign Application Priority Data

Dec. 26, 1996 [JP] Japan .................................. 8-348870
Mar. 7, 1997 [JP] Japan .................................. 9-053704

[51] Int. Cl.$^7$ .................................................. F16F 15/22
[52] U.S. Cl. .......................................... 74/573 R; 369/263
[58] Field of Search .............................. 74/574, 573 R, 74/573 F; 369/263

[56] References Cited

U.S. PATENT DOCUMENTS

| | | | |
|---|---|---|---|
| 3,109,321 | 11/1963 | Rogers | 74/573 R |
| 3,203,273 | 8/1965 | Favrot | 74/573 R |
| 3,282,127 | 11/1966 | Deakin | 74/573 R |
| 3,733,923 | 5/1973 | Goodrich et al. | 74/573 R |
| 3,854,347 | 12/1974 | Hellerich | 74/574 X |
| 4,653,169 | 3/1987 | Puszakowski | 156/304.2 |
| 4,674,356 | 6/1987 | Kilgore | 74/573 R |
| 4,794,588 | 12/1988 | Yoshitoshi et al. | 369/263 |
| 5,256,037 | 10/1993 | Chatelain | 417/423.7 |
| 5,391,952 | 2/1995 | Simazu et al. | 310/67 R |
| 5,694,269 | 12/1997 | Lee . | |
| 5,721,457 | 2/1998 | Sri-Jayantha et al. | 369/263 X |

FOREIGN PATENT DOCUMENTS 220742   9/1989   Japan .................................. 74/573 R

*Primary Examiner*—Mary Ann Green
*Attorney, Agent, or Firm*—Ronald P. Kananen; Rader, Fishman & Grauer

[57] ABSTRACT

A rotation control device capable of suppressing vibrations of a rotation unit produced due to changes in weight unbalances of the rotation unit. On a disc rotation control device 2, made up of a driving shaft 8 rotated along with an optical disc 90, a turntable 9, a motor rotor 10 and a magnet 15 mounted on the motor rotor 10, balancer members 6, 7 are mounted so that the balancer members 6, 7 are rotatably supported on the driving shaft 8. The disc rotation control device 2 causes rotation of the rotation unit such that a synthesized center of gravity of the rotation unit offset from the center of rotation by the unbalances of the optical disc 90 and the balancer members 6, 7 will coincide with the center of rotation.

5 Claims, 21 Drawing Sheets

PRIOR ART $$\left( \begin{array}{c} mr_2 \sum_{n=1}^{k} \cos \theta_n \fallingdotseq D \\ mr_2 \sum_{n=1}^{k} \sin \theta_n \fallingdotseq 0 \end{array} \right)$$

ROTATION CONTROL APPARATUS

BACKGROUND OF THE INVENTION

1. Field of the Invention

This invention relates to a technical field of rotation control. More particularly, it relates to a technical field of suppressing vibrations generated on rotating a rotating member exhibiting unbalanced weight.

2. Description of the Related Art

Many industrial machines, electrical devices for household use or computers are provided with a rotating member run in rotation by e.g., a motor. For example, an optical disc player device, provided on a computer, runs an optical disc, as a signal recording medium, in rotation by a disc rotation control device.

The optical disc player device has an optical pickup for illuminating a laser light beam on an optical disc run in rotation by the disc rotation control device. The disc rotation control device has a disc table for loading the optical disc thereon and a spindle motor for running the disc table in rotation.

The optical pickup includes a light source for illuminating a laser light beam on the optical disc and a photodetector for receiving the laser beam reflected on the signal recording surface of the optical disc. The optical pickup and the disc rotation control device are loaded on, for example, a mechanical chassis. This mechanical chassis supports the optical pickup for movement into and out of contact with the fixedly supported disc rotation control device.

With the above optical disc player device, the laser light outgoing from the optical pickup is illuminated on the optical disc run in rotation by the spindle motor for recording/reproducing data.

Between the mechanical chassis, carrying the optical pickup and the disc rotation control device, and a main body portion of the chassis, secured to the main body portion of the device, there is mounted a damper, supported in a floating fashion. By this floating support, the mechanical chassis cannot transmit vibrations from outside to the optical pickup.

There are occasions wherein an optical disc undergoes weight unbalances during manufacture. If an optical disc exhibiting this unbalanced weight is run in rotation, this optical disc 101 is oscillated along with a turntable 103 mounted on an end of a spindle shaft 102, as shown in FIG. 1, because the center of rotation and the center of gravity of the disc are not in coincidence with each other. In this case, the optical pickup cannot realize focusing of the optical disc with respect to the signal recording surface of the optical disc.

Moreover, the amount of the weight unbalance of an optical disc tends to be varied from one optical disc to another. Recently, it has become possible to record/ reproduce data for an optical disc at an elevated speed. However, if the number of revolutions is increased, an optical disc undergoes severer vibrations.

That is, failing suitable vibration suppressing means for the existing amount of unbalanced weight or the number of revolutions of the optical disc, the optical disc undergoes vibrations, as discussed above.

Meanwhile, it is difficult to suppress vibrations due to offset of the center of gravity by increasing control capability of the damper or rigidity of operating members. On the other hand, since the rotating members are used in many fields, typified by industrial machines or electrical devices for household use, it is desirable for the rotation control device to be flexibly applied to many types of devices.

SUMMARY OF THE INVENTION

It is therefore an object of the present invention to provide a rotation control device capable of suppressing vibrations even if weight unbalances of a rotating member are changed.

The present invention provides a rotation control device including a rotation unit rotated by driving means and a balancer member which, while being kept in contact with the rotation unit, is mounted for relative movement with respect to the rotation unit.

When the balancer member is rotated along with the rotation unit, the balancer member is moved to a position in which the synthesized center of gravity of the balancer member and the rotation unit coincides with the center of rotation.

DESCRIPTION OF PREFERRED EMBODIMENTS

Figure 1:
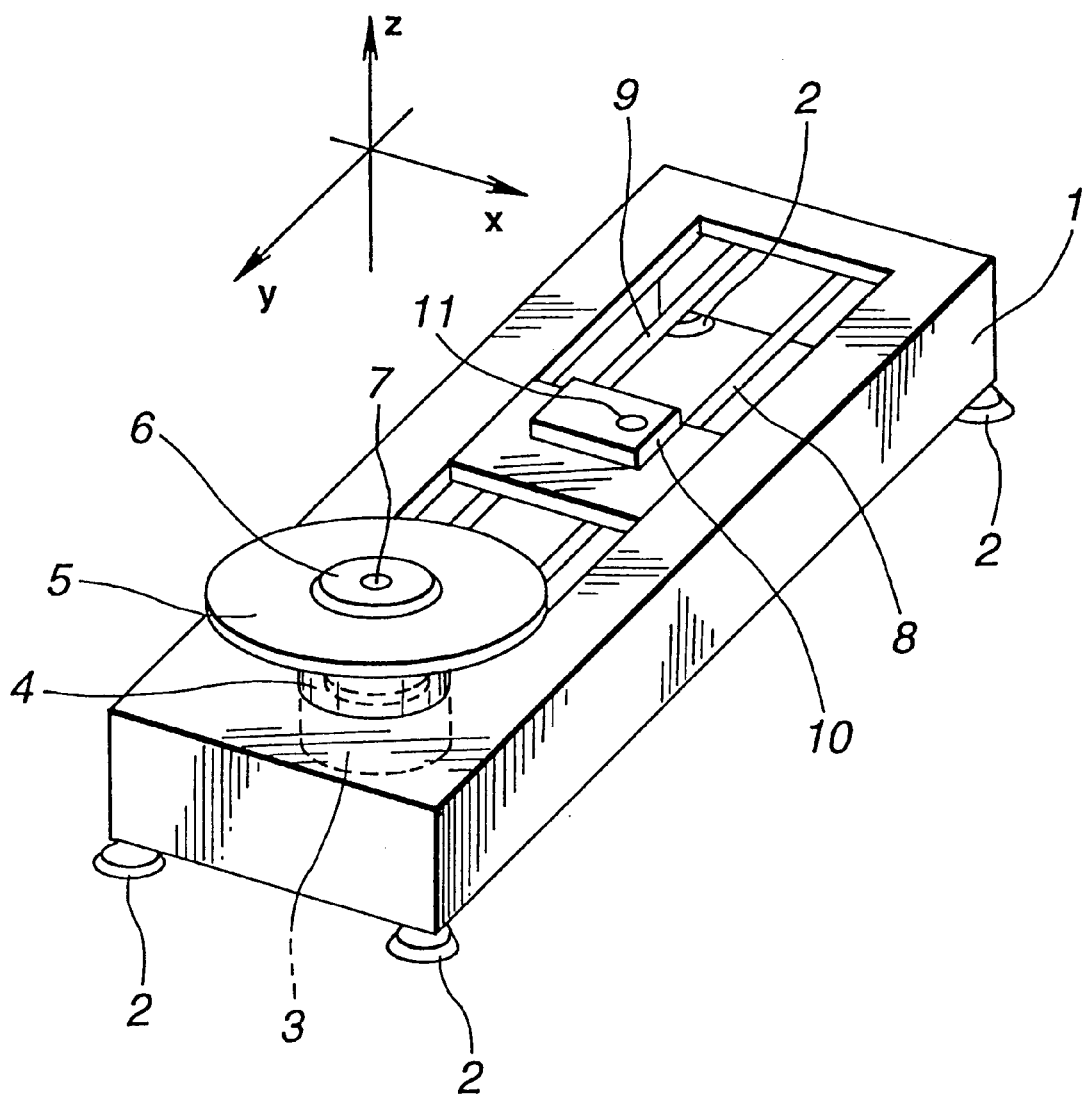
FIG. 1 shows the state of rotation of a conventional unbalanced optical disc.

Referring to the drawings, preferred embodiments of the present invention will be explained in detail.

In the first embodiment, the rotation control device according to the present invention is constructed as a disc rotation control device and is applied to a disc driving device for illuminating a laser light beam from an optical pickup on a rotating optical disc. This disc drive device represents a portion of an optical disc player device configured for writing or reading out data on or from the optical disc.

The optical disc is formed of a synthetic resin material, such as polycarbonate, in the form of a disc, 120 mm in diameter, having a signal recording surface thereon. The optical disc has a central circular opening and is positioned by a positioning member of a turntable of a disc rotation control device, as later explained, fitted into this circular opening.

Figure 2:
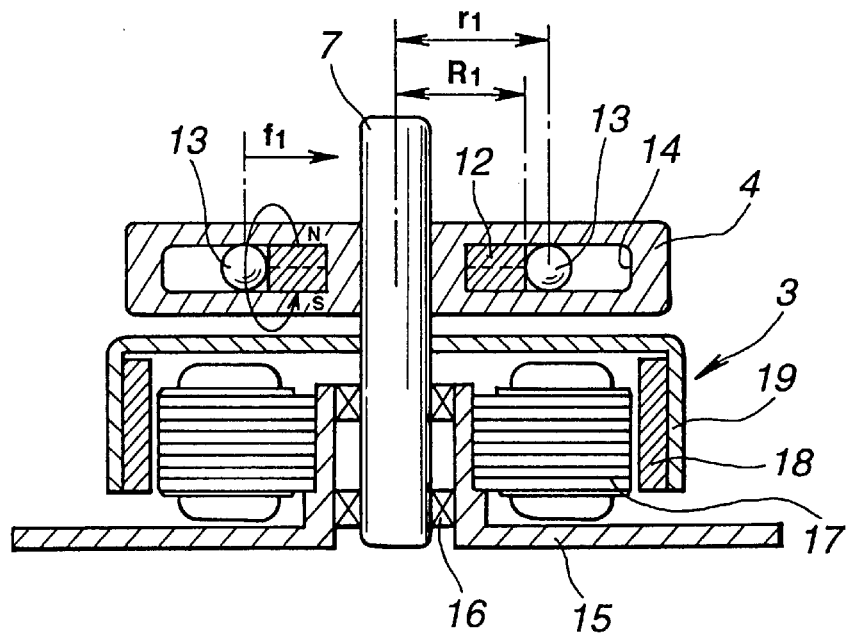
FIG. 2 is a perspective view of a disc drive device having a disc rotation control device embodying the invention.

Referring to FIG. 2, the disc drive device includes a mechanical chassis 4 for setting the disc rotation control device 2 and an optical pickup 3 thereon and three dampers 5a, 5b and 5c arranged between the mechanical chassis 4 and a chassis of the main body portion of the device, not shown, for floatingly supporting the mechanical chassis 4 with respect to the main body chassis.

The optical pickup 3 is slidably supported on the mechanical chassis 4 for illuminating the 1 on the optical disc.

The disc rotation control device 2 is made up of rotating units, namely a driving shaft 8, a turntable 9, a motor rotor 10 and a magnet 15 mounted on the motor rotor 10. The driving shaft 8, motor rotor 10 and the magnet 15 mounted on the motor rotor 10 make up a spindle motor 11 provided on the disc rotation control device 2.

Figure 3:
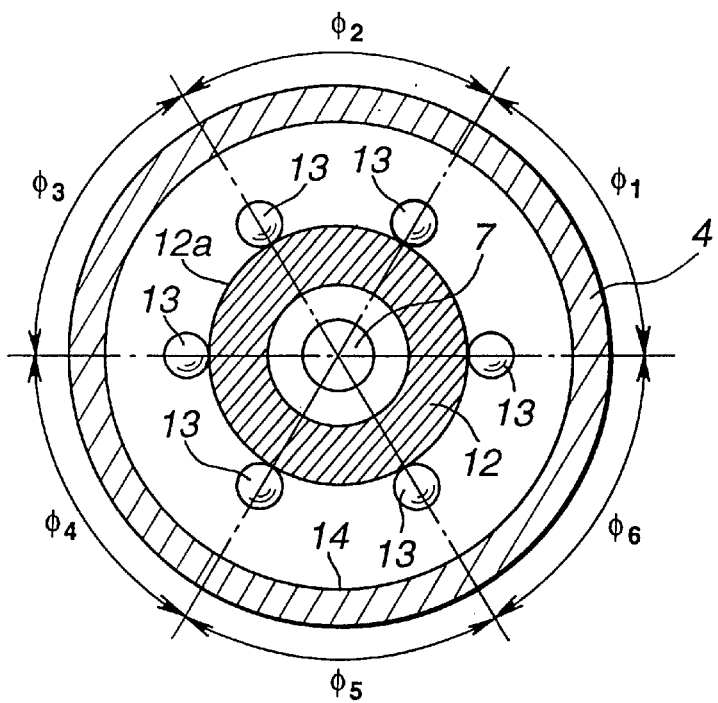
FIG. 3 is a cross-sectional view showing the disc rotation control device shown in FIG. 2.
Figure 4:
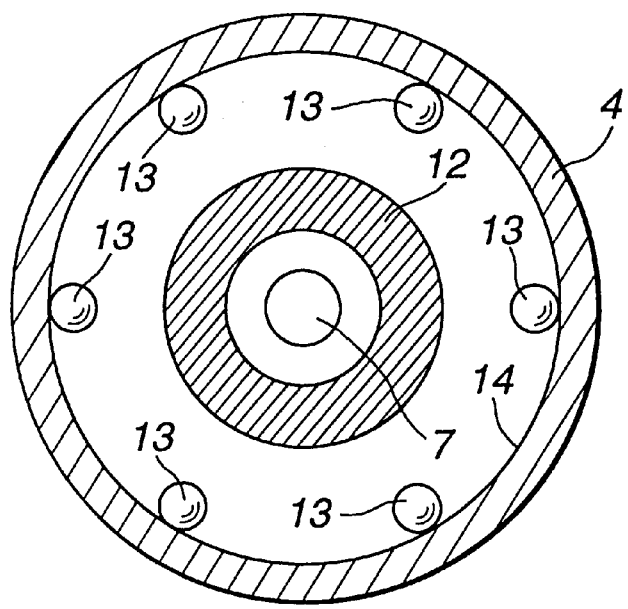
FIG. 4 is a plan view showing two substantially semi-circular balancer members having support s pivotally supported by a driving shaft of the disc rotation control device.

Referring to FIG. 3, the spindle motor 11 includes the driving shaft 8, operating as a spindle shaft, the substantially cylindrically-shaped motor rotor 10 and a bearing 13 having its one end secured to the mechanical chassis 4 and which rotatably supports the driving shaft 8. The spindle motor 11 also includes a coil 14 placed around the outer periphery of the bearing 13 and a magnet 15 mounted on the inner surface of the motor rotor 10 for facing the coil 14.

The turntable 9 has a central positioning portion 12 for positioning an optical disc 90. The positioning portion 12 has a central opening in which is fitted and supported the driving shaft 8. The positioning portion 12 is provided as an embossed portion at the center of the turntable 9 and is fitted into the circular opening formed in the center of the optical disc 90 for positioning the optical disc 90. The positioning portion 12 also has a magnetic portion, not shown, for removably mounting a clamp, not shown, fitted with a magnet, also not shown. That is, the positioning portion 12 and the clamp, not shown, are attracted and affixed to each other for reliably holding the optical disc 90 between the turntable 9.

The motor rotor 10 is secured to the lower surface of the turntable 9 for rotation along with the driving shaft 8. Within the motor rotor 10 are mounted two balancer members 6, 7 rotatably supported relative to the driving shaft 8.

The balancer members 6, 7 are mounted independently of each other for rotation about the driving shaft 8 so that respective major surfaces 6a, 7a thereof face each other via a spacer 16 in-between. These balancer members 6, 7 are formed substantially semi-circularly from a metallic material, such as stainless steel. The balancer members 6, 7 are provided with supports 6b, 7b at mid portions of non-arcuate end faces thereof as embossed portions.

That is, the balancer members 6, 7 are rotatably supported at mid portions of the supports 6b, 7b by the driving shaft 8.

The spindle motor 11 feeds the current to the coil 14 for rotating the motor rotor 10 for rotating the driving shaft 8 therewith. This driving shaft 8 is run in rotation in unison with the turntable 9 for constituting a rotating unit rotated in unison with the optical disc 90 loaded on the turntable 9. If the rotated optical disc 90 exhibits no unbalanced weight state or if the optical disc 90 is not mounted on the turntable 9, the two balancer members 6, 7 are positioned for facing each other via the center of rotation of the driving shaft 8 so as to be rotated with the rotating unit. The balancer members 6, 7, mounted in this manner on the driving shaft 8, suppress vibrations during rotation such as are produced in case the optical disc 90 exhibits weight unbalances.

Figure 12:
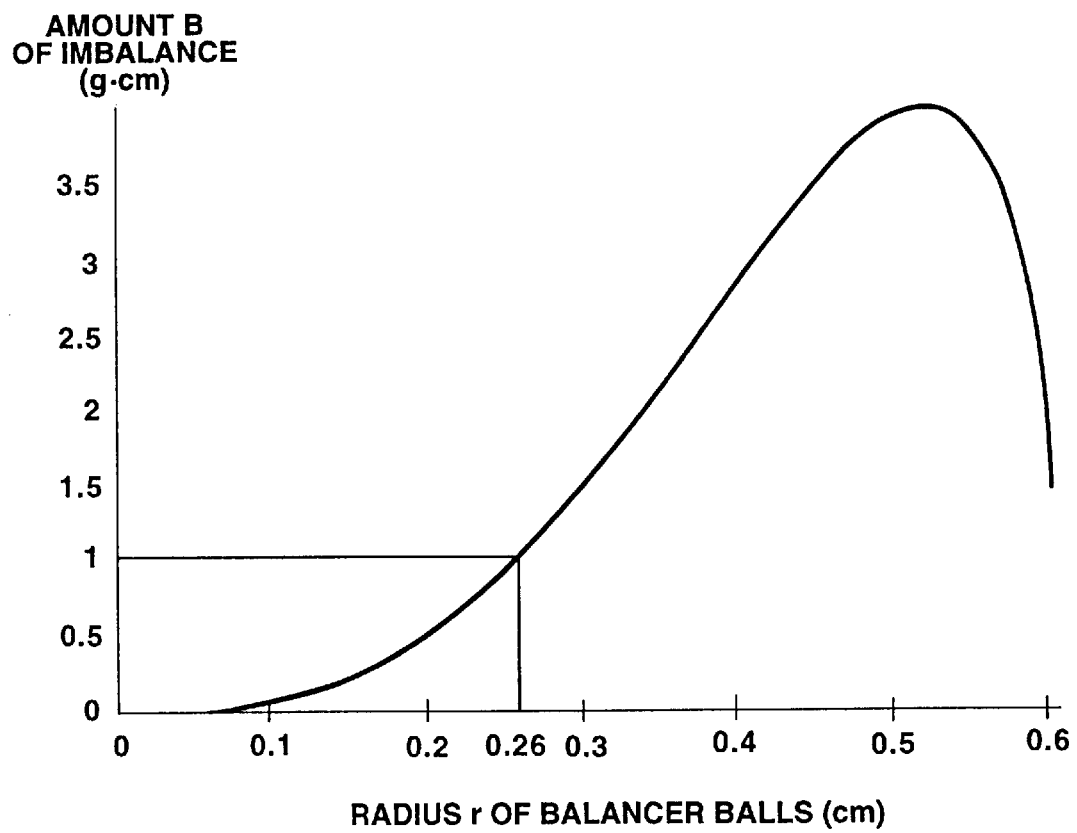
FIG. 12, consisting of FIGS. 12A to 12C, is a plan view showing position changes of the two weighted balancer members on rotation of an unbalanced optical disc.

The optical pickup 3 includes a semiconductor laser for illuminating a laser light beam and a photodetector for receiving the laser light reflected by the signal recording surface of the optical disc 90 for conversion into electrical signals. Thus, the optical pickup 3 illuminates the laser light on the optical disc 90 to receive the reflected laser light. The optical pickup 3 is supported by two guide shafts 17a, 17b mounted on the mechanical chassis 4, as shown in FIG. 12, and is slidably supported relative to the mechanical chassis 4. The optical pickup 3 is supported for movement in a direction towards and away from the disc rotation control device 2.

The disc drive device illuminates the laser light to the optical disc 90 from the optical pickup 3 moved from the inner rim towards the outer rim of the optical disc 90 by the disc rotation control device 2 in order to write or read out data based on the reflected light.

Meanwhile, there are occasions wherein weight unbalances are produced in the optical disc 90 during manufacture thereof. The unbalance means the center of gravity of the optical disc 90 not being positioned at the center of the optical disc 90. For example, such unbalance is produced when the optical disc 90 has nonuniform substrate thickness or nonuniform weight.

If such unbalanced optical disc 90 is run in rotation, the disc rotation control device 2 and the mechanical chassis 4, elastically supported by the dampers 5a, 5b, 5c, are subjected to vibrations. If such vibrations are produced, the balancer members 6, 7, rotatably supported relative to the driving shaft 8, are suitably rotated to suppress the vibrations.

That is, if the disc rotation control device 2 is rotated, the balancer members 6, 7 are rotated independently of the driving shaft 8 constituting the rotating unit. However, the balancer members 6, 7 are ultimately at a standstill relative to the driving shaft 8 so as to be rotated in unison with the driving shaft 8. The balancer members 6, 7 are then gradually moved to a position facing the unbalancing direction within the optical disc 90.

The unbalancing direction herein means such direction in which, due to the unbalance proper to the optical disc 90, the center of gravity of the rotating unit, constituted by the optical disc 90, driving shaft 8, turntable 9, motor rotor 10 and by the magnet 15, is offset relative to the center of rotation.

Figure 5:
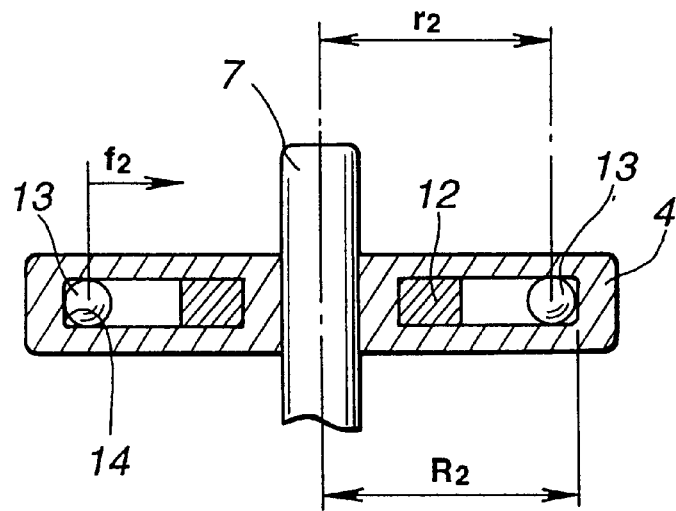
FIG. 5, consisting of FIGS. 5A AND 5C, is a plan view showing position changes of the two semi-circular balancer members on rotation of an unbalanced optical disc.
Figure 6:
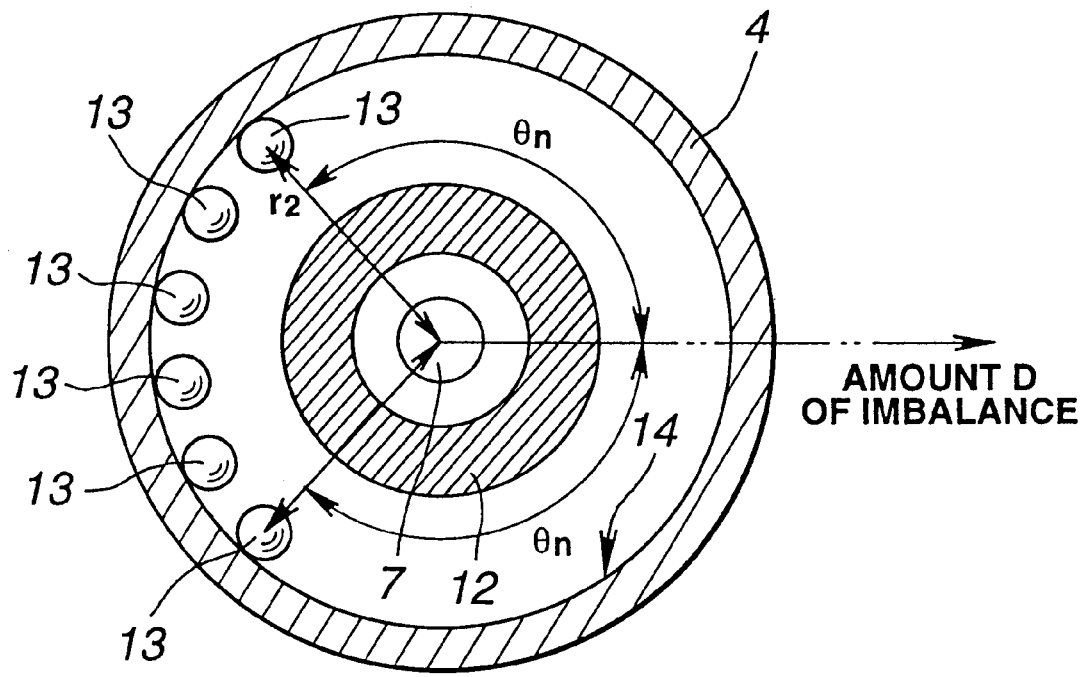
FIG. 6 is a side view of a disc rotation control device having two substantially rectangular balancer members rotationally supported by a driving shaft.

The balancer members 6, 7 are at a standstill relative to the rotating unit when the balancer members 6, 7 are at a position facing the above-mentioned unbalancing direction, as shown in FIG. 5A. At this time, the balancer members 6, 7 are symmetrical relative to a line including the unbalancing direction and the center of rotation (referred to hereinafter as a facing line), for canceling out the mutual unbalances. At this time, the balancer members 6, 7 are positioned facing the unbalancing direction, on the facing line, via the center of rotation.

Under this condition, the center of gravity of the rotating unit offset from the center of rotation by the unbalance of the optical disc 90, synthesized with the center of gravity of the balancer members 6, 7, referred to hereinafter occasionally as a synthesized center of gravity, is coincident with the center of rotation of the rotating unit. Therefore, the rotating unit can be rotated without undergoing vibrations.

Thus, if the unbalanced optical disc 90 is run in rotation, the balancer members 6, 7 are moved suitably by the so-called auto-centering operation for bringing the above-mentioned synthesized center of gravity with the center of rotation.

Therefore, the disc rotation control device can run the optical disc 90 in rotation without vibrations.

If the amount of unbalance of the optical disc 90 is increased, the angle between the balancer members 6, 7 is decreased by the auto-centering operation, so that the synthesized center of gravity coincides with the center of rotation, as shown in FIG. 5B.

The higher the number of revolutions of the rotating unit, the larger becomes the auto-centering effect. That is, the auto-centering operates more effectively the higher the number of revolutions required of a rotating unit, as in the case of an optical disc adapted for recording/reproducing data at an elevated speed.

Since the auto-centering operates effectively if the rotating unit rotates at a number of revolutions higher than the resonant frequency of the dampers 5a, 5b, 5c, the resonant frequency of the dampers 5a, 5b, 5c can be set so as to be smaller than the rotating frequency of the rotating unit for larger auto-centering effects.

Therefore, the disc rotation control device 2, provided with the balancer members 6, 7, is not vibrated on rotation of the optical disc 90. Thus, data can be written or read out without deterioration on or from the signal recording surface of the optical disc 90 exhibiting weight unbalances.

Moreover, if the balancer members 6, 7 are used, the above-described vibration suppressing effect is not varied even if the amount of unbalances of the rotating unit is occasionally changed, as when exchanging the optical disc as a part of the rotating unit.

The supports 6b, 7b of the balancer members 6, 7 can be provided with a bearing containing oil sealed therein. By provision of the bearing, the position of the synthesized center of gravity and the center of rotation of the rotating unit can be brought into coincidence with each other, thus enabling stable rotation of the disc rotation control device 2 in a shorter time.

Three or more balancer members, instead of the two, may be provided on the disc rotation control device 2.

A second embodiment is hereinafter explained. This second embodiment is directed to a disc rotation control device 22 having two substantially rectangular balancer members 23, 24 having one ends rotatably supported by the driving shaft 8.

The disc rotation control device 22 has a rotating unit rotated in unison with the optical disc 90, namely a driving shaft 8, a turntable 9, a damper 21, a motor rotor 10 and a magnet, not shown, and operates for clamping the optical disc 90 by the turntable 9 and the damper 21. The driving shaft 8, turntable 9, motor rotor 10 and the magnet, not shown, constitute a spindle motor.

Within the interior of the motor rotor 10, the spindle motor includes a bearing, having one end secured to the mechanical chassis 4 and adapted for rotatably supporting the driving shaft 8, a coil wound about the outer periphery of the bearing and a magnet mounted on the inner surface of the motor rotor 10 for facing the coil.

On the spindle motor are mounted two balancer members 23, 24, between the turntable 9 and the motor rotor 10, for rotation relative to the driving shaft 8.

The optical disc 90 is clamped between the turntable 9 and the damper 21.

Figure 7:
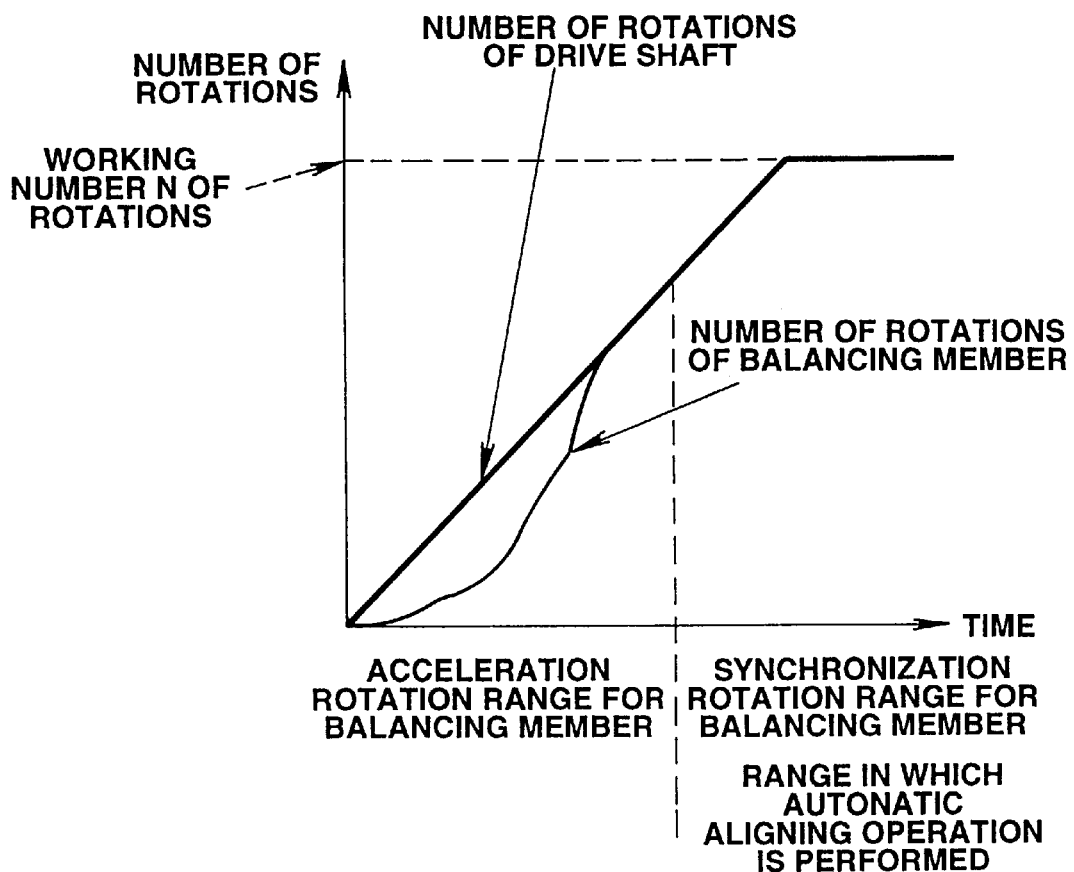
FIG. 7, consisting of FIGS. 7A to 7C, is a plan view showing position changes of the two rectangular balancer members on rotation of an unbalanced optical disc.

The balancer members 23, 24 are mounted independently from each other on the driving shaft 8 so that major surfaces 23a, 24a thereof will face each other. As shown in FIGS. 7A to 7C, these balancer members 23, 24 are formed of a metallic material in a substantially rectangular profile and are fitted at one ends thereof with supporting members 23b, 24b rotatably supported on the driving shaft 8.

If the optical disc 90 is free from unbalances, the balancer members 23, 24 are positioned facing each other via center of rotation of the driving shaft 8 for rotation along with the driving shaft 8, as shown in FIG. 7A.

However, if the optical disc 90 has unbalances, the balancer members 23, 24 are moved to a position facing the unbalancing direction, as indicated in FIG. 7B, at the same time as the balancer members 23, 24 are moved to a position facing each other on the facing line. At this time, the center of gravity synthesized from the center of gravity of the rotating unit and that of the balancer members 23, 24 is coincident with the center of gravity of the rotating unit. Thus, the rotating unit can rotate without vibrations.

That is, on rotation of the unbalanced optical disc 90, the balancer members 23, 24 are moved on their own by the auto-centering effect for bringing the synthesized center of gravity with the center of rotation.

If the optical disc 90 undergoes large unbalances, the balancer members 23, 24 operate for decreasing the angle therebetween so that the synthesized center of gravity will coincide with the center of rotation, as shown in FIG. 7C.

Therefore, the disc rotation control device 22 is not vibrated on rotation of the unbalanced optical disc 90.

Figure 8:
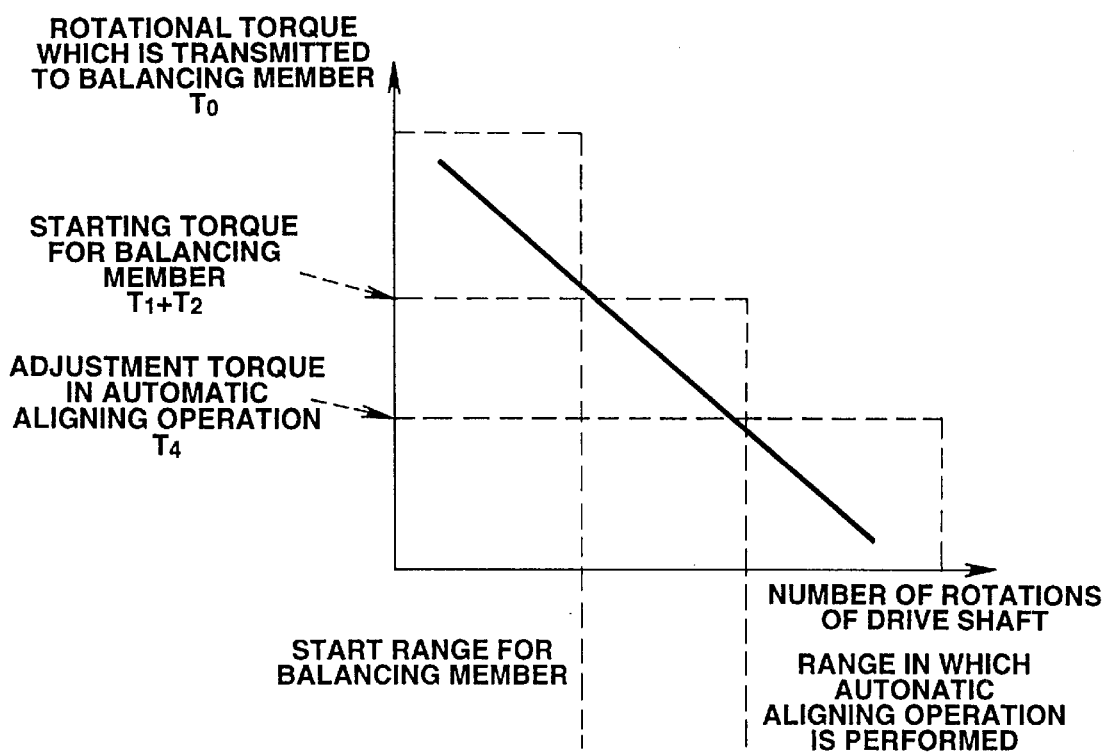
FIG. 8, consisting of FIGS. 8A and 8B is a plan view showing a bearing mounted on a pivot shaft of the substantially semi-circular balancer member.

The supporting members 23b, 24b of the balancer members 23, 24 may be constituted by bearings 25, 25, as shown in FIGS. 8A and 8B. Meanwhile, the bearings 25, 25 contain a viscous fluid, such as oil, enclosed therein.

By provision of the bearings 25, 25, it is possible to reduce the slip of the balancer members 23, 24 relative to the driving shaft 8, due to the viscosity of oil, on startup of rotation of the driving shaft 8.

Thus, the synthesized center of gravity can promptly be brought into coincidence with the center of rotation of the rotating unit, by the balancer members 23, 24, since the startup of rotation. Thus it is possible with the balancer members 23, 24 to promptly realize auto-centering and to realize stable rotation of the rotating unit by the viscosity proper to oil.

Therefore, the disc rotation control device 22, provided with the balancer members 23, 24, can suppress vibrations promptly as from the startup of rotation, despite weight unbalances of the optical disc 90.

Figure 9:
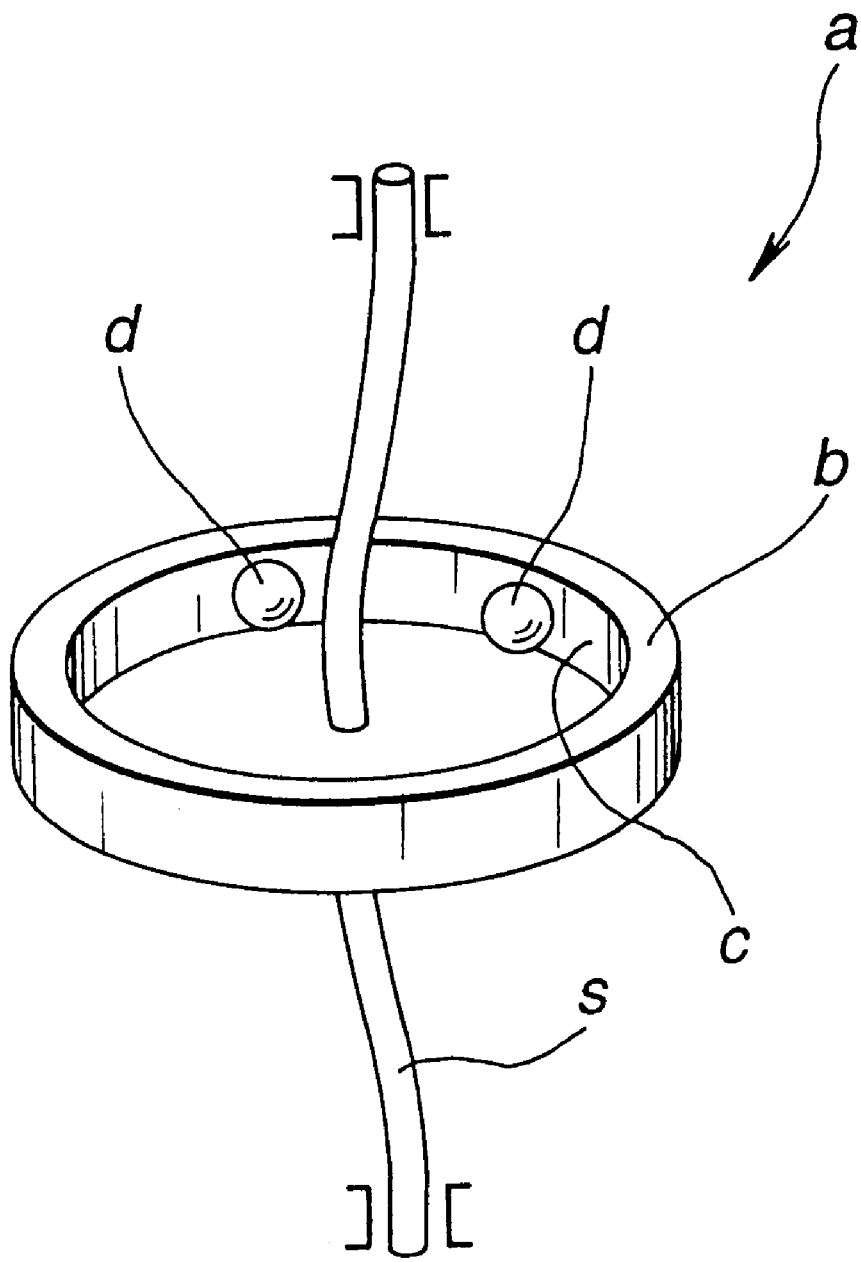
FIG. 9 is a graph showing the relation between the number of revolutions of a driving shaft and that of the balancer member.

In FIG. 9, showing the relation between the rotation of the driving shaft 8 and the balancer members 23, 24, the number of revolutions is plotted on the vertical axis and time elapsed since startup of rotation is plotted on the horizontal axis.

Referring to FIG. 9, the balancer members 23, 24, rotated with a lag from the number of revolutions of the driving shaft 8 (or the rotating unit), is accelerated after lapse of a pre-set time such that it is ultimately rotated in unison with the driving shaft 8. Although the balancer members 23, 24 are rotated at this time in unison with the driving shaft 8, the balancer members 23, 24 are as yet not moved to the effective auto-centering position. This state of the balancer members 23, 24 is shown in FIG. 8A.

When the number of revolutions of the driving shaft 8 is increased further, the balancer members 23, 24, rotated in unison with the driving shaft 8, are moved to the effective auto-centering position. This state of the balancer members 23, 24 is shown in FIG. 8B.

In order for the balancer members 23, 24 to promptly catch up with the number of revolutions of the driving shaft 8 to thereby promptly realize the auto-centering effect, the bearings 25, 25 are set for satisfying the conditions concerning the rotational torque.

That is, the bearings 25, 25 are set so that, on startup of rotation of the driving shaft 8, from its standstill state, the rotational torque T0 by the viscosity of oil sealed in the bearing 25 will satisfy the following equation (1):

$$T0 > T1 + T2 \tag{1}$$

where T1+T2 represents rotation startup torque. The torque T1 is given by $T1 = J\beta$, while the torque T2 is a moment taking into account the horizontal rotation of the driving shaft 8, where $\beta$ is an angular acceleration on startup of rotation of the balancer members 23, 24, J and M are the moment of inertia of each of the balancer members 23, 24, and R is the separation of the center of gravity G.

In addition, the bearings 25, 25 are set so that, during synchronous rotation with the driving shaft 8, the following relation:

$$T0 < T4 \tag{2}$$

is met, wherein T0 is the rotational torque of the bearing 25 and T4 is an adjustment torque operating by auto-centering on the balancer members 23, 24 during rotation of the driving shaft 8.

Figure 10:
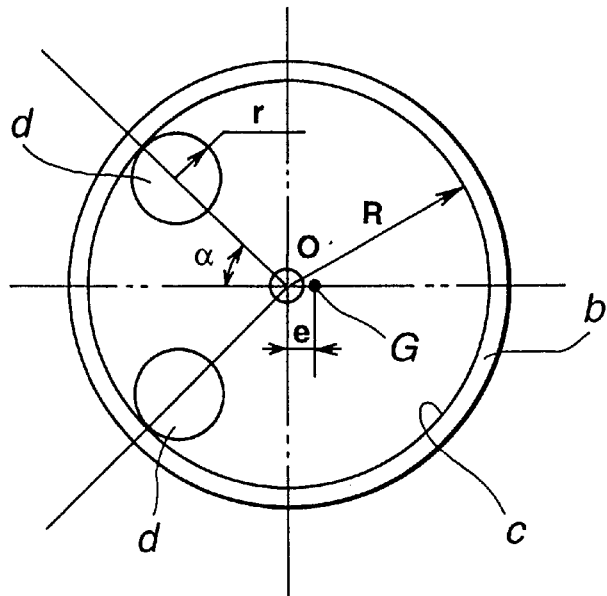
FIG. 10 is a graph showing the relation between the number of revolutions of a driving shaft and the rotational torque transmitted from the bearing to the balancer member.

That is, it suffices if the rotational torque T0 of the bearing 25 is set to a value not less than the start torque T1+T2 or to a value not larger than the adjustment torque T4 during start of rotation of the driving shaft 8 (an area A in FIG. 10) or during the time of operation of the auto-centering (an area B in FIG. 10), respectively. For example, FIG. 10 shows that the difference in the number of revolutions, that is the speed difference, between the driving shaft 8 and the balancer member, is decreased with the increased number of revolutions of the driving shaft 8 and concomitantly the rotational torque transmitted from the driving shaft 8 to the balancer member is decreased.

When the balancer members 23, 24 have reached the range of synchronous rotation, the angle of the balancer members 23, 24 is changed to an angle θ represented by D=2M tan θ, where D is an amount of unbalance of the optical disc 90.

By employing the bearing 25, set for satisfying the value of the rotational torque T0, the balancer members 23, 24 can be rotated synchronously with the balancer members 23, 24 in a short time, thus promptly realizing the auto-centering.

Three or more rectangular-plate-shaped balancer members, instead of the two, may be provided on the disc rotation control device 22.

A third embodiment is hereinafter explained. This third embodiment is directed to a disc rotation control device 22, having two balancer members 28, 29 having weights 33, 34 on one ends of strings 31, 32 the opposite ends of which are rotatably supported relative to the driving shaft 8, as shown in FIG. 11.

The disc rotation control device 22 is configured similarly to the second embodiment except component parts of the balancer members 28, 29. Therefore, parts or components similar to those of the second embodiment are denoted by the same reference numerals and the corresponding description is omitted, while only the balancer members 28, 29 are hereinafter explained.

Figure 11:
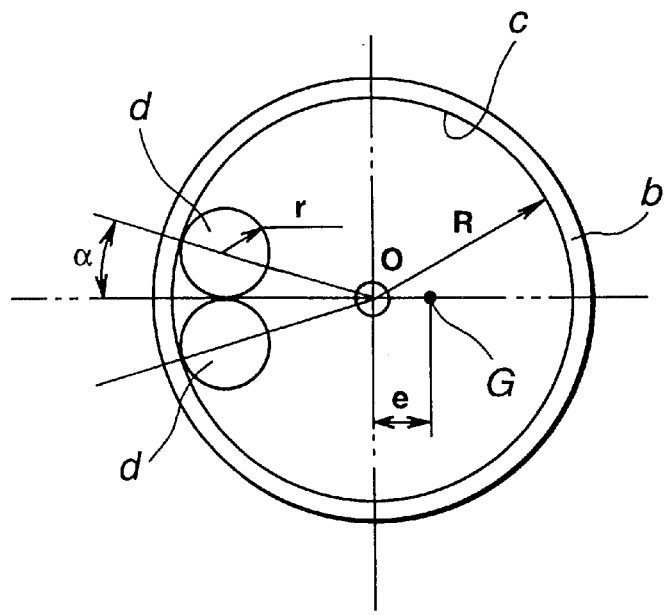
FIG. 11 is a side view of a disc rotation control device in which two balancer members having spherical weights are rotatably supported via a string by a driving shaft.

Referring to FIGS. 11 and 12, the balancer members 28, 29 include a supporting ring 30, rotatably supported relative to the driving shaft 8, strings 31, 32 having one ends secured to the supporting ring 30 and spherically-shaped weights 33, 34 of a metallic material connected to the opposite ends of the strings 31, 32.

Thus, the weights 33, 34 of the balancer members 28, 29 are rotatably relative to the driving shaft 8 by the supporting ring 30, while being limited in its movement by the strings 31, 32 so that the weights 33, 34 can be moved only a distance equal to a pre-set radius from the center of rotation of the driving shaft 8, that is a distance equal to a length of the strings 31, 32.

If the optical disc 90 has no unbalances, the weights 33, 34 of the balancer members 28, 29 are positioned so that the weights 33, 34 face each other via the center of rotation of the driving shaft 8, and are rotated in unison with the driving shaft 8, as shown in FIG. 12A.

On the other hand, if the optical disc 90 has unbalances, the weights 33, 34 of the balancer members 28, 29 are moved to a position facing the unbalancing direction of the optical disc 90, via the center of rotation, while being moved to the mutually facing position on the facing line, for mutually canceling the unbalances, as shown in FIG. 12B. At this time, the center of gravity, synthesized from the center of gravity of the rotating member and the center of gravity of the weights 33, 34, coincides with the center of rotation of the rotating unit. Thus, the rotating unit can be rotated without vibrations.

That is, if the optical disc 90 having weight unbalances is run in rotation, the balancer members 28, 29 are moved on their own by the auto-centering action, thus bringing the synthesised center of gravity into coincidence with the center of rotation.

If the amount of the unbalances of the optical disc 90 is large, the balancer members 28, 29 operate for reducing the angle between the weights 33, 34 for bringing the synthesised center of gravity into coincidence with the center of rotation.

Thus, with the disc rotation control device 22, the optical disc 90 having weight unbalances is not vibrated on rotation.

Figure 13:
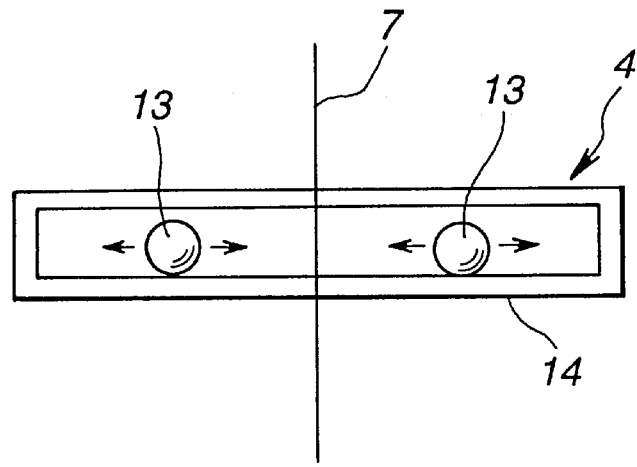
FIG. 13, consisting of FIGS. 13A and 13B, is a plan view showing position changes of the two chain-shaped balancer members on rotation of an unbalanced optical disc.

Meanwhile, a chain formed of a metallic material, instead of the strings 31, 32 and the weights 33, 34, may be mounted on the supporting ring 30 to provide balancer members 37, 38, as shown in FIG. 13. The balancer members 37, 38, provided with the chain, is changed suitably in its position, depending on the amount of unbalances of the optical disc 90, so as to be moved until the synthesized center of gravity reaches the center of rotation.

That is, if the optical disc 90 has weight unbalances, the chain-shaped balancer members 37, 38 are moved to a position facing the unbalancing direction as shown in FIG. 13B, while being moved to a mutually facing position on the facing line for canceling out the unbalances.

If the amount of the unbalances of the optical disc 90 is large, the chain-shaped balancer members 37, 38 operate for reducing the angle therebetween for bringing the synthesised center of gravity with the center of rotation.

Three or more weights or chains, instead of two, may be provided on the balancer members.

A fourth embodiment is hereinafter explained. This fourth embodiment is directed to a disc rotation control device 22, provided with a bar-shaped balancer member 41 having its mid portion rotatably supported by the driving shaft 8, as shown in FIG. 14.

The disc rotation control device 22 is configured similarly to the second embodiment except component parts or components of the balancer member 41.

Therefore, parts or components similar to those of the second embodiment are denoted by the same reference numerals and the corresponding description is omitted, while only the balancer member 41 are hereinafter explained.

Figure 14:
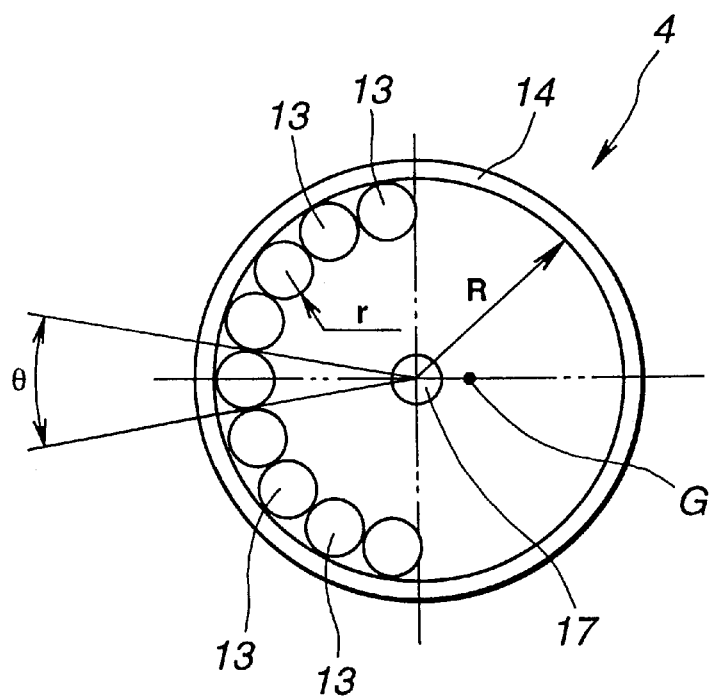
FIG. 14 is a side view of a disc rotation control device in which a balancer member comprised of a bar-shaped elastic member is rotatably supported relative to a driving shaft.
Figure 15:
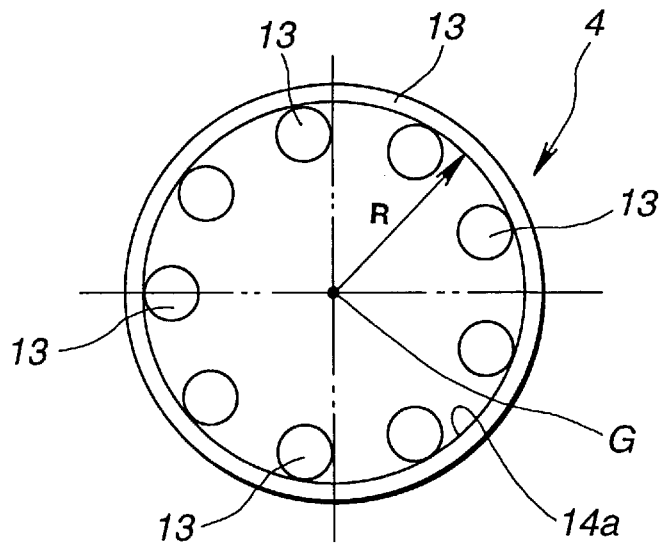
FIG. 15, consisting of FIGS. 15A to 15C, is a plan view showing elastic deformation of the balancer member comprised of the bar-shaped elastic member on rotation of an unbalanced optical disc.

Referring to FIGS. 14 and 15, the balancer member 41 is a bar-shaped elastic member carrying a support 41a at its mid portion. The support 41a is rotatably supported relative to the driving shaft 8.

Thus, end portions 41b, 41c of the bar-shaped balancer member 41 formed of an elastic material are supported for rotation relative to the driving shaft 8 so as to be limited to an elastic deflection less than a pre-set radius from the center of rotation of the driving shaft 8 by the inner lateral surface of the support 41a operating as movement imitation means.

If the optical disc 90 is free from weight unbalances, the balancer member 41 is positioned so that the end portions 41b, 41c face each other via the center of rotation of the driving shaft 8 and is rotated in unison with the driving shaft 8, as shown in FIG. 15A.

However, if the optical disc 90 has weight unbalances, the balancer member 41 is elastically deformed so that the end portions 41b, 41c will face the unbalancing direction and to each other on the facing line for canceling out the unbalances, as shown in FIG. 15B. At this time, the center of gravity synthesized from the center of gravity of the rotating unit and the center f gravity of the end portions 41b, 41c coincides with the center of rotation of the rotating unit. Thus, the rotating unit can be rotated without vibrations.

That is, if the optical disc 90 having weight unbalances is run in rotation, the balancer member 41 is moved on its own by the auto-centering action for bringing the position of the synthesized center of gravity into coincidence with the position of the synthesized center of gravity.

If the amount of the unbalances of the optical disc 90 is large, the balancer member 41 operates for reducing the angle between the end portions 41b, 41c for bringing the synthesised center of gravity with the center of rotation.

Thus, with the disc rotation control device 22, the optical disc having weight unbalances is not vibrated on rotation.

The balancer member formed by a bar-shaped elastic member may be formed as a balancer member 45 made up of bar-shaped resilient members 45a, 45b, 45c, 45d, 45e, 45f, 45g and 45h extending radially from a support 46 secured to and supported by the driving shaft 8.

Figure 16:
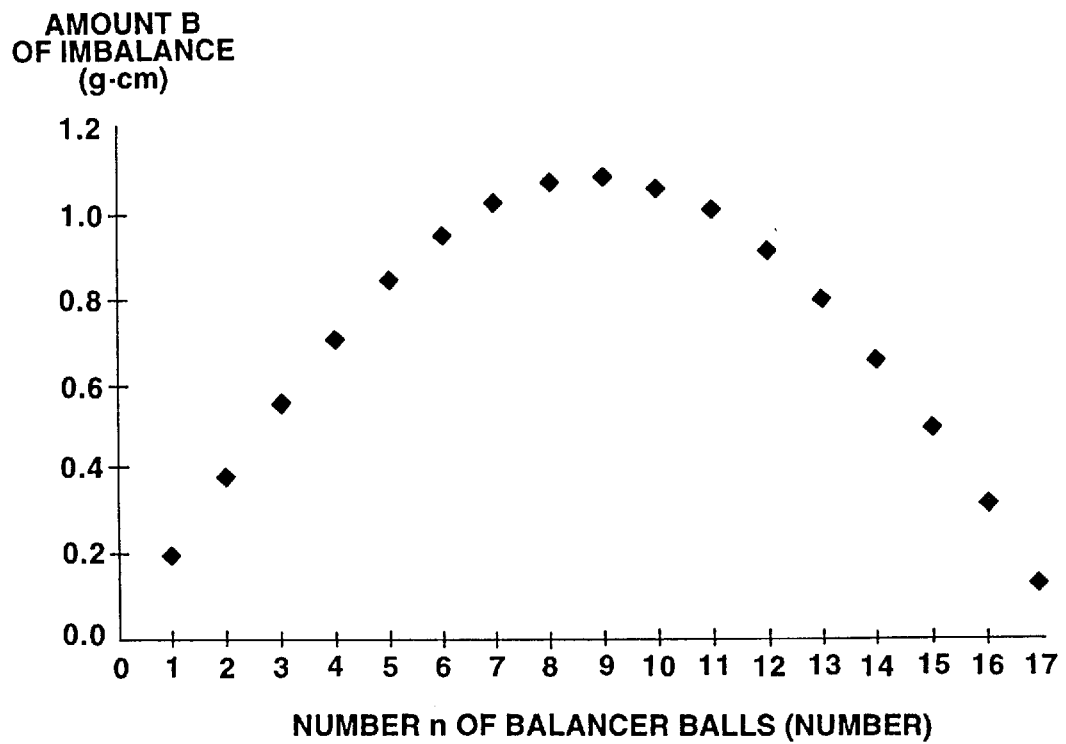
FIG. 16, consisting of FIGS. 16A and 16B, is a plan view showing elastic deformation of the balancer member comprised of plural bar-shaped elastic members and having the support fixedly supported relative to the driving shaft.

If the optical disc 90 exhibits weight unbalances, the balancer member 45 elastically flexes the bar-shaped resilient members 45a, 45b, 45c, 45d, 45e, 45f, 45g and 45h for facing the unbalancing direction and for facing one another for reciprocally canceling out the unbalances, as shown in FIG. 16B.

A plurality of the the balancer members each made up of the bar-shaped members may also be provided in the disc rotation control device 22.

Figure 17:
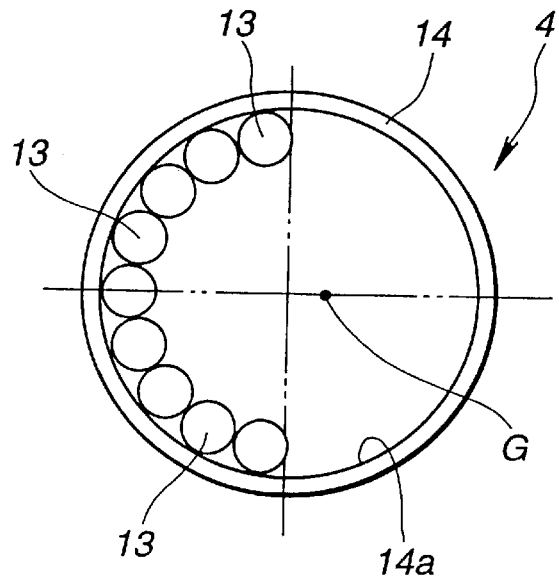
FIG. 17 is a side view of a disc rotation control device in which two ring-shaped balancer members are inserted into and supported by the driving shaft.

A fifth embodiment is hereinafter explained. This fifth embodiment is directed to a disc rotation control device 22 having ring-shaped balancer members 49, 50 in the inner periphery of which is passed a driving shaft 8, as shown in FIG. 17.

The disc rotation control device 22 is configured similarly to the second embodiment except component parts of the balancer members 49, 50. Therefore, parts or components similar to those of the second embodiment are denoted by the same reference numerals and the corresponding description is omitted, while only the balancer members 49, 50 are hereinafter explained.

Figure 18:
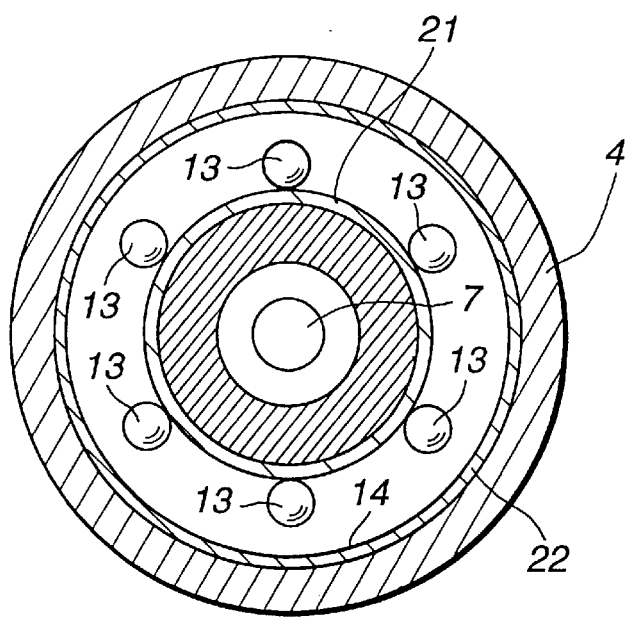
FIG. 18, consisting of FIGS. 18A to 18C, is a plan view showing position changes of two ring-shaped balancer members on rotation of an unbalanced optical disc.

The balancer members 49, 50 are formed of a metallic material in the form of flat-plate-shaped rings within which the driving shaft 8 is introduced, as shown in FIG. 18. The balancer members 49, 50 are housed within a substantially circular casing of a reduced thickness 51 passed through and supported by the driving shaft 8, as shown in FIG. 17. Specifically, the driving shaft 8 is passed through the inner periphery of the balancer members 49, 50 and through the casing 51.

Thus, the balancer members 49, 50 are slidably supported by the casing 51 and limited as to the amount of movement relative to the driving shaft 8 by inner peripheral surfaces 49*a*, 50*a* operating as movement limiting means.

If the optical disc 90 is free from weight unbalances, the balancer members 49, 50 are positioned symmetrically relative to each other at the center of rotation of the driving shaft 8, and is rotated in unison with the driving shaft 8, as shown in FIG. 18A. That is, the balancer members 49, 50 are positioned at the maximum axial separation from each other, with the inner peripheral surfaces 49*a*, 50*a* thereof being partially supported by the driving shaft 8.

If conversely the optical disc 90 has weight unbalances, the balancer members 49, 50 are moved to a position facing the unbalancing direction, and for facing each other on the facing line for mutually canceling out the unbalances. At this time, the center of gravity synthesized from the center of gravity of the rotating unit and that of the balancer members 49, 50 is coincident with the center of rotation of the rotating unit. Thus, the rotating unit can be rotated without vibrations.

Thus, if the optical disc 90, having the weight unbalances, is run in rotation, the ring-shaped balancer members 49, 50 are moved suitably on their own by the auto-centering action for bringing the synthesized center of gravity into coincidence with the center of rotation.

If the amount of the unbalances of the optical disc 90 is large, the balancer members 49, 50 reduce the mutual separation until the synthesized center of gravity coincides with the position of the center of rotation.

Thus, with the present disc rotation control device 22, the optical disc 90 is not vibrated even if the disc has weight unbalances.

Three or more ring-shaped balancer members, instead of two, may be provided on the disc rotation control device 22.

The ring-shaped balancer members may also be housed within a casing 51 charged with a viscous fluid. If the balancer members are housed within the casing 51 charged with the viscous fluid, it becomes possible with the disc rotation control device 22 to realize prompt coincidence of the position of the synthesized center of gravity with the position of the center of rotation of the rotating unit so that the rotating unit can promptly reach the state of stabilized rotation.

A sixth embodiment is hereinafter explained. This sixth embodiment is directed to a disc rotation control device 22 having four spherically-shaped balancer members 54, 55, 56, 57 held for movement on a circle centered about the center of rotation of the driving shaft 8.

The disc rotation control device 22 is configured similarly to the second embodiment except component parts of the balancer members 54 to 57. Therefore, parts or components similar to those of the second embodiment are denoted by the same reference numerals and the corresponding description is omitted, while only the balancer members 54 to 57 are hereinafter explained.

Figure 19:
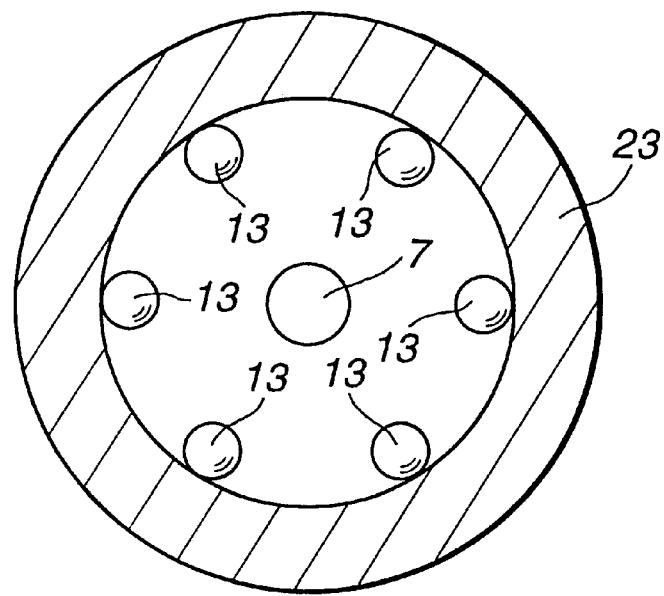
FIG. 19 is a side view of a disc rotation control device adapted for movably holding four spherically-shaped balancer members concentrically with respect to a driving shaft.
Figure 20:
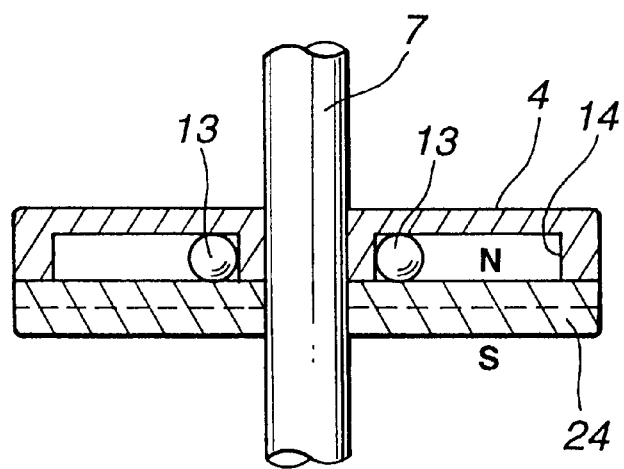
FIG. 20, consisting of FIGS. 20A to 20C, is a plan view showing position changes of the four spherically-shaped balancer members on rotation of an unbalanced optical disc.

The balancer members 54 to 57 are spherically shaped from a metallic material as shown in FIGS. 19 and 20. The balancer members 54 to 57 are held by a substantially circular casing 58 of a reduced thickness for movement on a circle centered about the center of rotation of the driving shaft 8.

The casing 51 is made up of a circular inner wall section 58*a*, having its center fixedly supported by the driving shaft 8, and an outer wall section 58*b*, the inner peripheral surface of which is formed at a pre-set constant separation from the outer peripheral surface of the inner wall section 58*a*. The inner wall section 58*a* and the outer wall section 58*b* are formed as-one with each other for closing the upper and lower surfaces of the spaced-apart portion. That is, the balancer members 54 to 57 are held movably in the spaced-apart portion between the inner wall section 58*a* and the outer wall section 58*b*.

If the optical disc 90 is free from unbalances, the balancer members 54 to 57 are positioned facing optional other balancing members, via the center of rotation of the driving shaft 8, for being rotated in unison with the driving shaft 8, as shown in FIG. 20A.

If conversely the optical disc 90 has weight unbalances, the balancer members 54 to 57 are moved to a position facing the unbalancing direction, as shown in FIG. 20B. Moreover, the balancer members 54 to 57 are moved to a position in which two neighboring spherical members face two remaining neighboring spherical members on a facing line for canceling out unbalances between the spherical members. Thus, the rotating unit can be rotated without vibrations.

That is, if optical disc 90, having the weight unbalances, is run in rotation, the balancer members 54 to 57 are moved suitably on their own by the auto-centering action for bringing the synthesized center of gravity into coincidence with the center of rotation.

If the amount of the unbalances of the optical disc 90 is large, the mutual separation between the balancer members 54, 55 and the balancer members 56, 57 is reduced, as shown in FIG. 20C.

Five or more spherically-shaped balancer members, instead of four, may be provided on the disc rotation control device 22.

The spherically-shaped balancer members may also be housed within a casing 58 charged with a viscous fluid. If the balancer members are housed within the casing 51 charged with the viscous fluid, it becomes possible with the disc rotation control device 22 to realize prompt coincidence of the position of the synthesized center of gravity with the position of the center of rotation of the rotating unit, so that the rotating unit can promptly reach the state of stabilized rotation.

If additionally the contact surface of the balancer members with the casing 58 is such as to produce moderate friction against the casing 58, the position of the synthesized center of gravity can be promptly brought into coincidence with the position of the center of rotation of the rotating unit.

Figure 21:
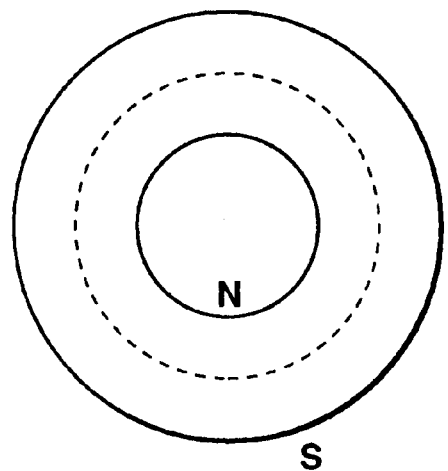
FIG. 21 is a plan view showing eight spherically-shaped balancer members housed around a driving shaft by a constraining member.
Figure 22:
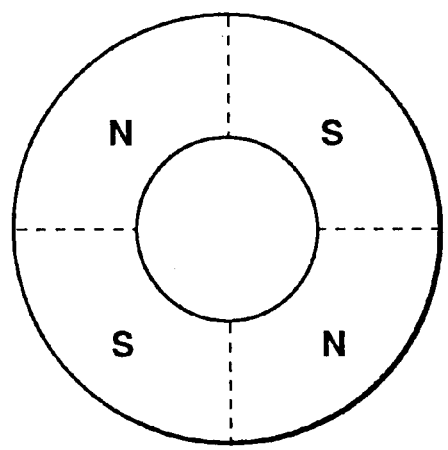
FIG. 22, consisting of FIGS. 22A and 22B, is a cross-sectional view showing position changes of the eight spherically-shaped balancer members constrained by and released from a constraining member.

The casing may also be configured as shown in FIGS. 21 and 22.

The casing 86 is made up of a circular inner wall section 86*a*, for securing the center of the driving shaft 8, a bottom plate section 86*b*, a top plate section 86*c*, an outer wall section 86d, the inner peripheral surface of which is formed at a certain spacing from the outer peripheral surface of the inner wall section 86a and a number of partitioning plates 87 corresponding to the number of the balancer members 78 to 85 for housing the balancer members. The bottom plate section 86b has a contact surface 86e inclined towards the axial center position.

The balancer members 78 to 85 are arranged equiangularly around the driving shaft 8, by the partitioning plates 87, such that, at the start of operation of the rotating unit, the balancer members are concentrated in the vicinity of the driving shaft 8. That is, the partitioning plates 87 and the contact surface 86e operate as constraining means for the balancer members.

When the rotating unit has reached a pre-set number of revolutions, the balancer members 78 to 85 are moved radially outwards and substantially moved in the circumferential direction along the inner periphery of the outer wall section 86d for performing the auto-centering by the balancer members 78 to 85.

Since the balancer members 78 to 85 are rotated up to a preset number of revolutions in unison with the rotating unit, and are substantially moved radially, the position of the synthesized center of gravity can be brought into coincidence with the center of rotation of the rotating unit, thus realizing the auto-centering promptly.

The disc rotation control device 22, provided with the above balancer members, can suppress vibrations on rotation of the optical disc 90 having weight unbalances.

By properly setting the angle of inclination of the contact surface 86e, the balancer members 78 to 85 can be moved radially at an optimum timing, that is at an optimum rotational timing. Since this also enables the balancer members 78 to 85 to be uniformly arranged about the driving shaft 8, the driving shaft 8 can be rotated in stability on startup of rotation.

A seventh embodiment is hereinafter explained. This seventh embodiment is directed to a disc rotation control device 22 having a fluid balancer member 61 held for flowing in a circular area centered about the center of rotation of the driving shaft 8.

The disc rotation control device 22 is configured similarly to the second embodiment except component parts of the balancer member 61. Therefore, parts or components similar to those of the second embodiment are denoted by the same reference numerals and the corresponding description is omitted, while only the balancer member 61 are hereinafter explained.

Figure 23:
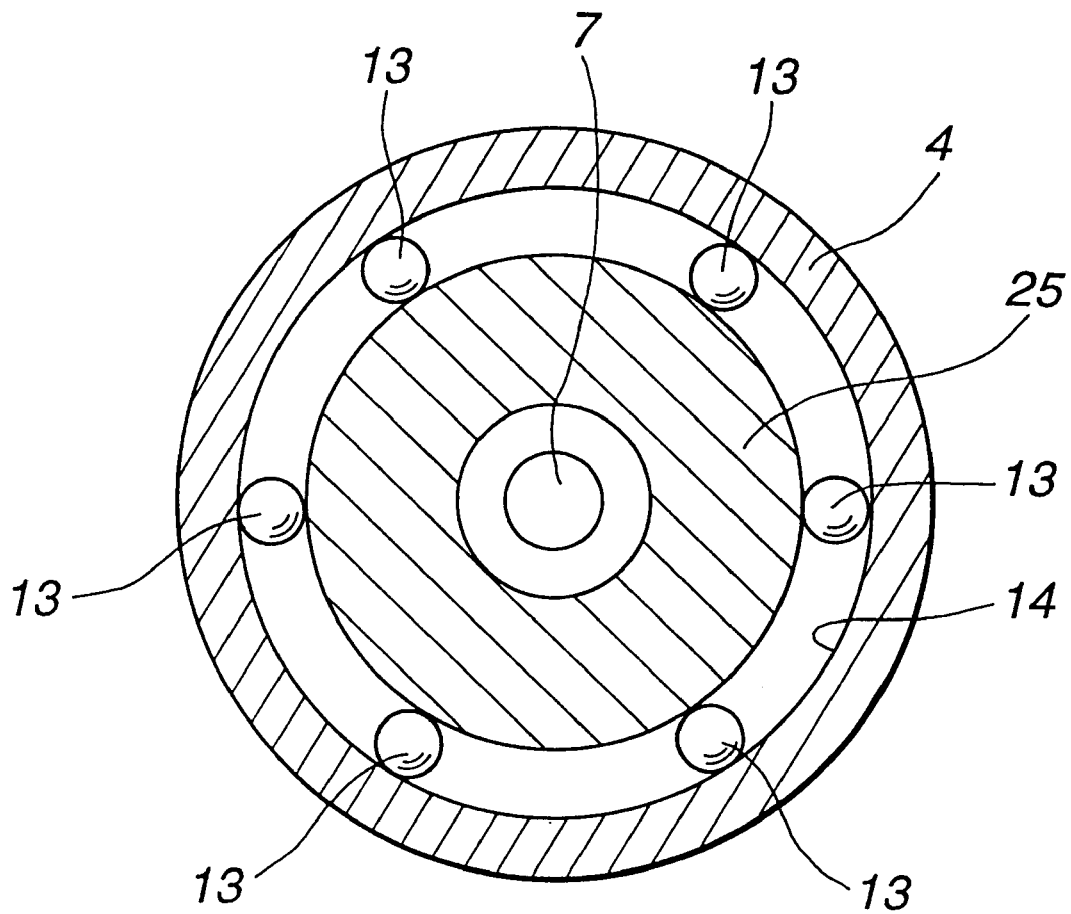
FIG. 23 is a side view showing a disc rotation control device adapted for supporting a balancer member formed of a fluid for flowing concentrically with respect to a driving shaft.
Figure 24:
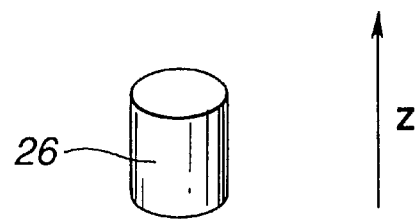
FIG. 24, consisting of FIGS. 24A and 24B, is a plan view showing the flowing state of the balancer member constituted by the fluid on rotation of an unbalanced optical disc.
Figure 25:
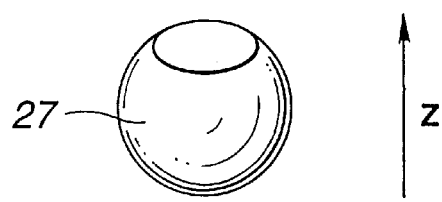
FIG. 25 is a side view showing a disc rotation control device in which a sole elliptically-shaped balancer member is inserted into and supported by a driving shaft.

The balancer member 61 is constituted by a fluid, as shown in FIGS. 23 and 24. The balancer member 61, which is a fluid material, is enclosed for flowing on a circle centered about the center of rotation of the driving shaft 8 by the substantially circular casing 62 of a reduced thickness.

The casing 51 is made up of an inner wall section 62a, having its center fixedly supported by the driving shaft 8, and an outer wall section 62b, the inner peripheral surface of which is formed at a pre-set constant separation from the outer peripheral surface of the inner wall section 62a. The inner wall section 62a and the outer wall section 62b are formed as-one with each other for closing the upper and lower surfaces of the spaced-apart portion. That is, the balancer member 61 is held movably in the spaced-apart portion between the inner wall section 62a and the outer wall section 62b.

If the optical disc 90 has weight unbalances, this balancer member 61 flows for facing the unbalancing direction, and is symmetrical on the facing line for canceling out the unbalances in the fluid, as shown in FIG. 24A. At this time, the synthesized center of gravity of the rotating unit and the balancer member 61 coincides with the center of rotation of the rotating unit. Thus, the rotating unit can be rotated without vibrations.

That is, the balancer member 61 of the fluid material is moved on its own by auto-centering, on rotation of the optical disc having weight unbalances, for bringing the synthesized center of gravity into coincidence with the position of the center of rotation.

If the amount of unbalances of the optical disc 90 is large, the balancer member 61 flows so as to collect near the facing line for bringing the synthesized center of gravity with the center of rotation. The balancer member may also be constituted by a powdered material, instead of by the fluid.

The disc rotation control device 22 is configured similarly to the second embodiment except component parts of a balancer member 6. Therefore, parts or components similar to those of the second embodiment are denoted by the same reference numerals and the corresponding description is omitted, while only the balancer member 65 are hereinafter explained.

The balancer member 65 is formed in the shape of an elongate ring from a metallic material. The elongated ring shaped balancer member 61 is formed so that the width of the inner short side is slightly larger than the diameter of the driving shaft 8. The balancer member 65 is held in a substantially circular casing 66 of a reduced thickness passed through and held by the driving shaft 8.

That is, the balancer member 65 is rotatable with respect to the driving shaft 8 as the center of rotation and is slidable relative to the driving shaft 8 along the inner long side.

Figure 26:
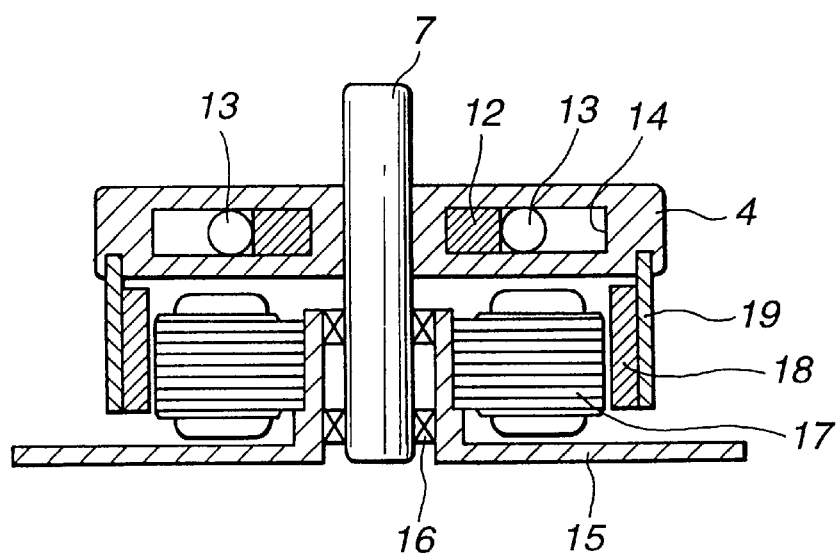
FIG. 26, consisting of FIGS. 26A to 26C, is a plan view showing position changes of the elliptically-shaped balancer member on rotation of an unbalanced optical disc.

If the optical disc 90 is free from unbalances, the balancer member 65 is rotated in unison with the driving shaft 8, with the its center of rotation substantially coincident with the center of rotation of the driving shaft 8, as shown in FIG. 26A.

If the optical disc 90 has weight unbalances, this balancer member 65 is moved so as to be positioned on the facing line so that the direction of the center of the balancer member 65 is reversed from the unbalancing direction, as shown in FIG. 26B. At this time, the synthesized center of gravity of the rotating unit and the balancer member 65 coincides with the center of rotation of the rotating unit. Thus, the rotating unit can be rotated without vibrations.

That is, the balancer member 65 of the fluid material is moved on its own by auto-centering, on rotation of the optical disc having weight unbalances, for bringing the synthesized center of gravity into coincidence with the position of the center of rotation.

If the amount of unbalances of the optical disc 90 is large, the balancer member 65 is slid on the facing line to a position facing the unbalancing direction and further away from the center of rotation for bringing the synthesized center of gravity with the position of the center of rotation.

Therefore, with the disc rotation control device 22, an optical disc having weight unbalances is not vibrated on rotation.

Figure 27:
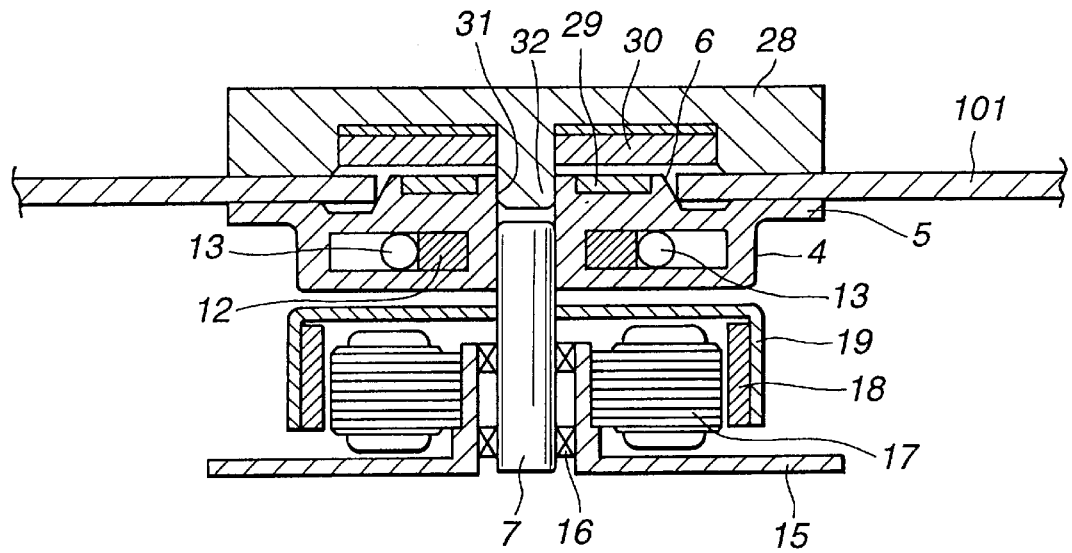
FIG. 27, consisting of FIGS 27A and 27B, is a plan view showing position changes of the elliptically-shaped balancer member having an unbalanced weight portion rotation of an unbalanced optical disc.

Meanwhile, a weight offset portion 67a may be formed as-one with one longitudinal end of an elongated ring shaped balancer member 67, as shown in FIGS. 27A and 27B.

If the optical disc 90 is free from weight unbalances, the balancer member 67 is moved so that the driving shaft 8 is positioned on one side of the balancer member 67 formed with a weight offset 67a, so that the balancer member 67 is rotated in unison with the driving shaft 8, as shown in FIG. 27A.

If conversely the optical disc 90 has weight unbalances, the balancer member 67 is slid so that the weight offset 67*a* will face the unbalancing direction via driving shaft 8, as shown in FIG. 27B.

Since the balancer member 67 is formed with the weight offset 67*a*, a smaller amount of movement suffices for the balancer member 67 than that for the elongate ring shaped balancer member 65. Stated differently, with the balancer member 67 formed with the weight offset 67*a*, the auto-centering operates effectively taking into account the amount of the unbalances.

Figure 28:
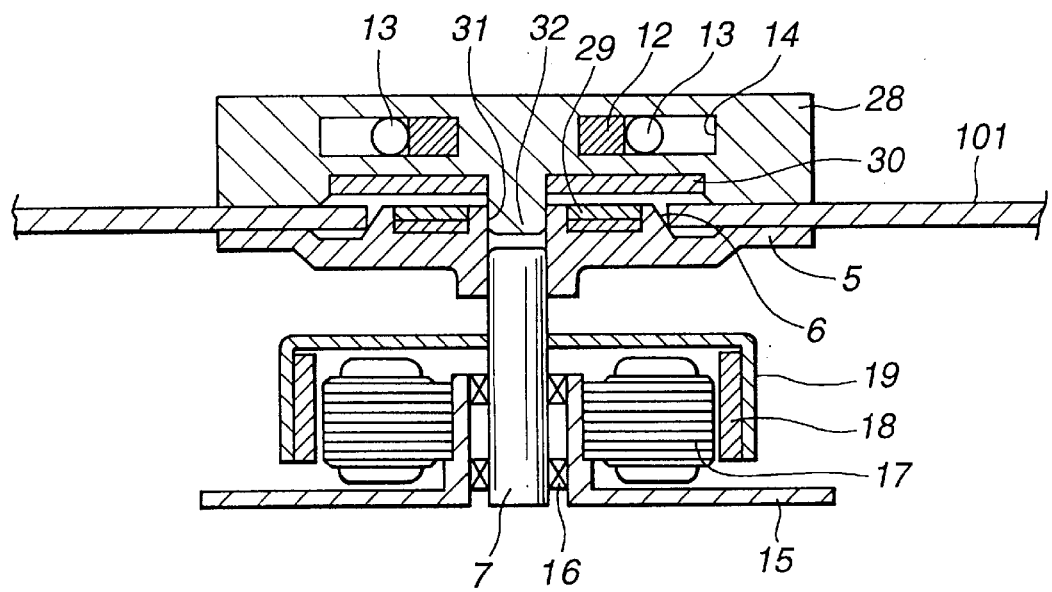
FIG. 28, consisting of FIGS. 28A and 28B, is a plan view showing position changes of the ring-shaped balancer member on rotation of an unbalanced optical disc.

The balancer member may also be formed in a circular ring shape, as shown in FIG. 28.

If the optical disc 90 is free from weight unbalances, a balancer member 68, thus formed, is rotated in unison with the driving shaft 8, with the center of gravity thereof coincident with the center of rotation of the driving shaft 8, as shown in FIG. 28A. If conversely the optical disc 90 has weight unbalances, the balancer member 68 is moved for facing the unbalancing direction until the synthesized center of gravity of the balancer member 68 and the rotating unit coincides with the center of rotation.

The elongate ring shaped balancer member 65, the balancer member 67 formed with the weight offset 67*a* and the circular ring shaped balancer member 68 may also be housed within a casing 66 charged with a viscous fluid. If the balancer members are housed within the casing 66 charged with the viscous fluid, it becomes possible with the disc rotation control device 22 to realize prompt coincidence of the position of the synthesized center of gravity with the position of the center of rotation of the rotating unit, as in the above-described second embodiment, so that the rotating unit can promptly reach the state of stabilized rotation.

A ninth embodiment is hereinafter explained. This ninth embodiment is directed to a disc rotation control device 22 having a disc-shaped balancer member 71 adapted for being movable within a casing 72 mounted on the driving shaft 8, as shown in FIG. 29.

The disc rotation control device 22 is configured similarly to the second embodiment except component parts of the balancer member 71. Therefore, parts or components similar to those of the second embodiment are denoted by the same reference numerals and only the balancer member 71 are hereinafter explained.

Figure 29:
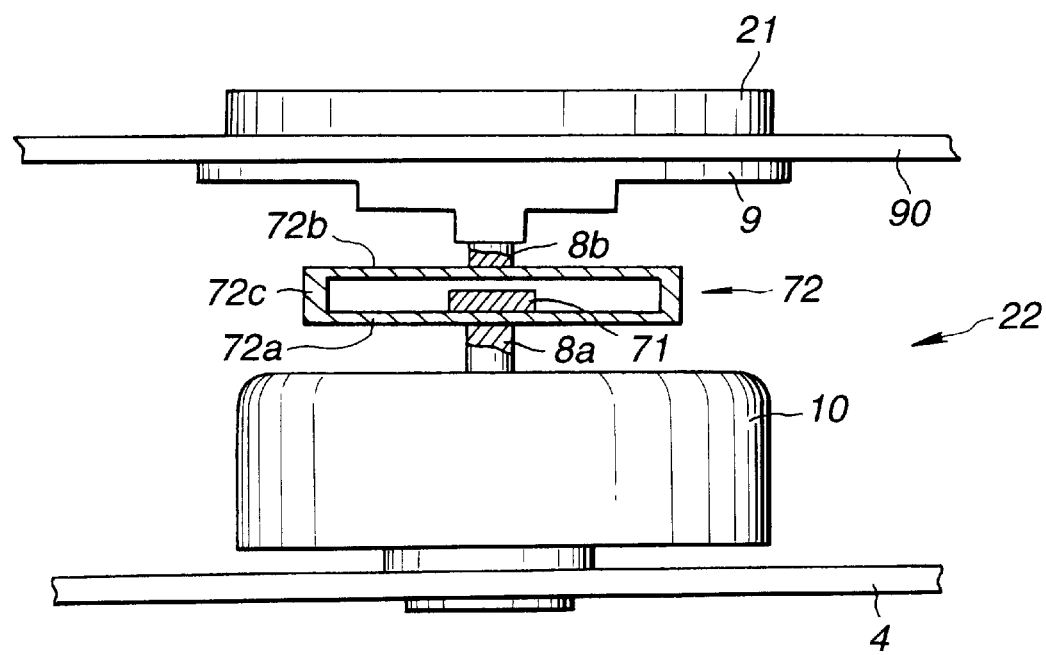
FIG. 29 is a side view of a disc rotation control device for supporting the substantially circular balancer member for movement relative to the driving shaft.
Figure 30A:
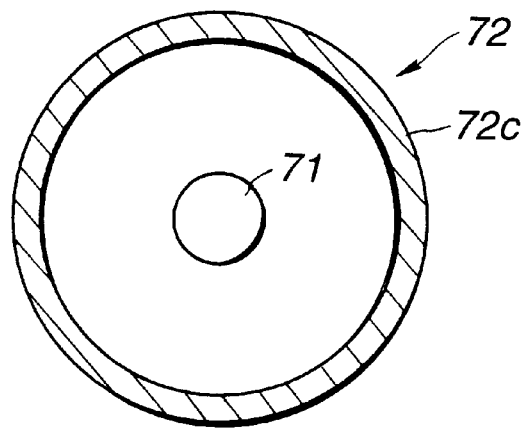
FIG. 30, consisting of FIGS. 30A to 30C, is a plan view showing position changes of a disc-shaped balancer member on rotation of an unbalanced optical disc.
Figure 30B:
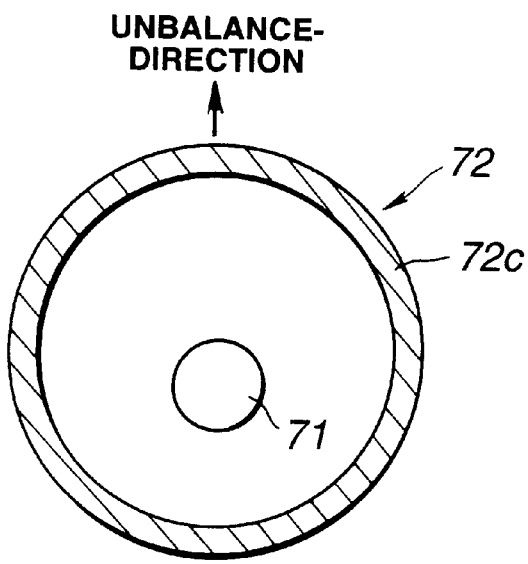
Figure 30C:
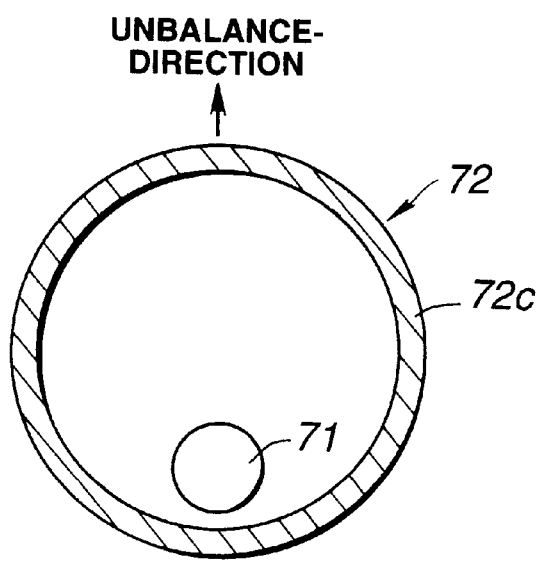

The balancer member 71 is constituted in the shape of a substantially circular disc from a metallic material, as shown in FIGS. 29 and 30. The balancer member 71 is enclosed in a substantially circular casing 72 of a reduced thickness.

This casing 72 is made up of a lower major surface section 72*a*, an upper major surface section 72*b* and an outer peripheral wall section interconnecting these major surface sections. A shaft portion 8*a* of the driving shaft 8 rotatably supported by the driving shaft 8 is caused to bear against the outer surface of the lower major surface section 72*a* of the casing 72, while the end of a shaft portion 8*b* of the driving shaft 8 is caused to bear against the outer surface of its upper major surface section 72*b*.

Thus, the balancer member 71 is slidable within the interior of the casing 72.

If the optical disc 90 is free from weight unbalances, the balancer member 71 is rotated along with the rotating unit, not shown, with the center of gravity of the balancer member 71 coincident with the center of rotation of the rotating unit.

If the optical disc 90 has weight unbalances, the balancer member 71 is moved to a position facing the unbalancing direction, via the center of rotation, as shown in FIG. 30B. At this time, the synthesized center of gravity of the rotating unit and the balancer member 71 is coincident with the center of rotation of the rotating unit. Therefore, the rotating unit can be rotated without vibrations.

That is, on rotation of the optical disc 90 having weight unbalances, the balancer member 71 is moved on its own by auto-centering for bringing the synthesized center of rotation with the center of rotation.

If the amount of unbalances of the optical disc is large, the balancer member 71 is slid to a position further removed from the center of rotation for bringing the synthesized center of rotation into coincidence with the center of rotation.

Therefore, the disc rotation control device 22 is not vibrated on rotation of the optical disc having weight unbalances.

The balancer member 71 may also be housed within a casing 72 charged with a viscous fluid. If the balancer members are housed within the casing 72 charged with the viscous fluid, it becomes possible with the disc rotation control device 22 to realize prompt coincidence of the position of the synthesized center of gravity with the position of the center of rotation of the rotating unit, as in the second embodiment, so that the rotating unit can promptly reach the state of stabilized rotation.

If additionally the contact surface of the balancer member with the casing 58 is designed to produce moderate friction against the casing 73, the position of the synthesized center of gravity can be promptly brought into coincidence with the position of the center of rotation of the rotating unit.

A tenth embodiment is hereinafter explained. This tenth embodiment is directed to a disc rotation control device 22 having a substantially rectangular balancer member 75 one end of which is rotatably supported by the driving shaft 8, as shown in FIG. 3 1.

The disc rotation control device 22 is configured similarly to the second embodiment except component parts of the balancer member 75. Therefore, parts or components similar to those of the second embodiment are denoted by the same reference numerals and only the balancer member 75 is hereinafter explained.

Figure 31:
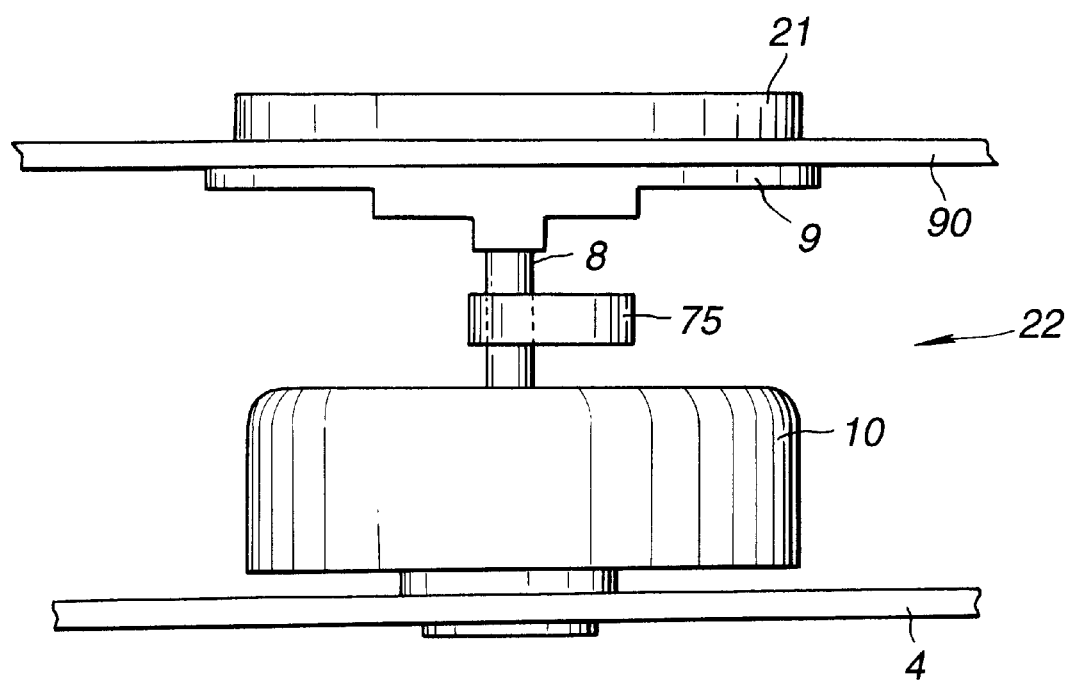
FIG. 31 is a side view of a disc rotation control device adapted for supporting the substantially rectangular balancer member for rotation relative to the driving shaft.
Figure 32:
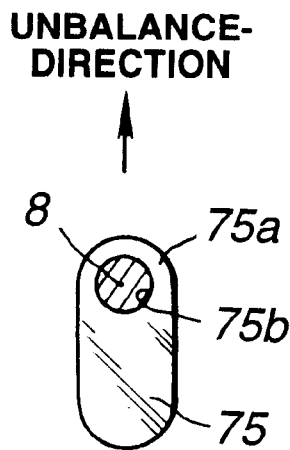
FIG. 32 is a plan view showing position changes of the rectangular balancer member on rotation of an unbalanced optical disc.

The balancer member 75 is formed as a substantially rectangular member from, for example, a metallic material, and carries a support 75*a* on its one end, as shown in FIGS. 31 and 32. The balancer member 75 has this support 75*a* rotatably supported by the driving shaft 8.

If the optical disc 90 has weight unbalances, the balancer member 75 is moved so that its end opposite to the support 75*a* faces the unbalancing direction via the center of rotation, and hence the rotating unit can be rotated substantially without vibrations.

That is, the balancer member 75 is suitably moved on its own by the auto-centering action even if the optical disc 90 has weight unbalances, until the synthesized center of gravity substantially coincides with the position of the center of rotation.

Thus, the disc rotation control device 22 can suppress vibrations to a certain extent even if the optical disc 90 being rotated has weight unbalances.

Figure 33:
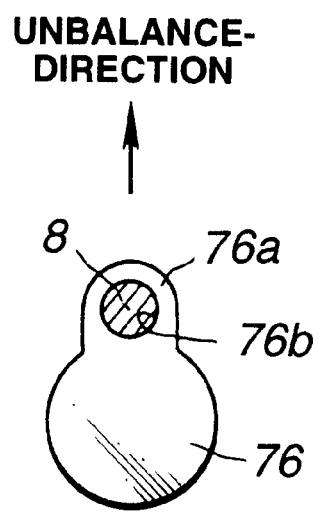
FIG. 33 is a plan view showing position changes of a rectangular balancer member having a weight offset on rotation of an unbalanced optical disc.

The end of the balancer member 75 opposite to the support 75*a* may be circular, as shown in FIG. 33.

Although the rotation control device of the present invention has been explained above in connection with the disc rotation control device, the rotation control device may also be applied to an industrial machine or electronic equipment for household use.

With the rotation control device of the present invention, in which the balancer member is mounted for movement within an area less than a pre-set distance from the center of rotation of the rotation unit, it is possible to suppress vibrations produced by occasional changes in the weight unbalances of the rotation unit.

What is claimed is:

1. A rotation control device, comprising:

a rotation unit rotated by driving means; and at least one balancer member mounted on a portion of said rotation unit and adapted for being moved in an area spaced a distance less than a pre-set distance from the center of rotation of said rotation unit;

said balancer member being moved relative to the rotation unit, upon rotation of said rotation unit, so that the synthesized center of gravity of said balancer member and said rotation unit will coincide with said center of rotation wherein said driving means is a spindle motor comprising:

a spindle shaft; a cylindrical rotor; a bearing attached to a chassis which rotatably supports said spindle shaft; a coil located around the outer periphery of said bearing; and a magnet mounted on the inner surface of said cylindrical rotor, and said rotation unit includes a disc-shaped recording medium.

2. The rotation control device as claimed in claim 1 wherein said balancer member is spherically-shaped and adapted for being movable in a circular area centered on the center of rotation of said rotation unit.

3. The rotation control device as claimed in claim 2 wherein said spherically-shaped balancer member is ranged at a constant position when the rotation unit starts rotation from its still state, said balancer member starting movement when the number of revolutions of the rotation unit exceeds a pre-set value.

4. The rotation control device as claimed in claim 1 wherein said rotation unit is supported via a supporting shaft on a base block carried by a solid elastic member.

5. The rotation control device as claimed in claim 4 wherein the resonant frequency of said elastic member is not higher than the frequency of rotation of the rotation unit in use.

* * * * *